W. MEDLOCK, Jr.
SPRING MOUNTING FOR CYCLE WHEELS.
APPLICATION FILED OCT. 15, 1915.
1,194,206.  Patented Aug. 8, 1916.
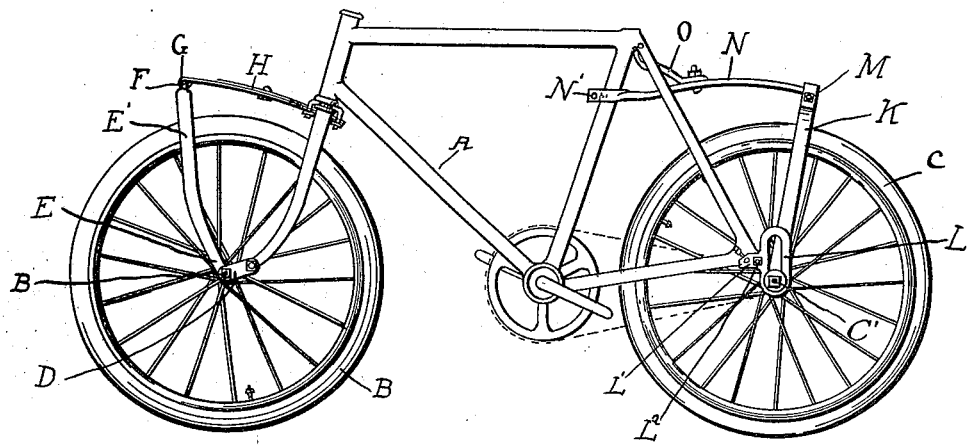
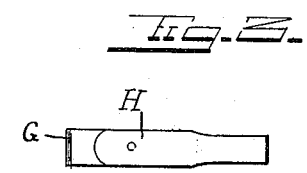
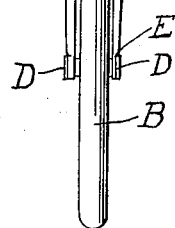
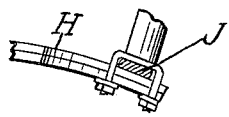

UNITED STATES PATENT OFFICE.

WENDYL MEDLOCK, JR., OF COQUILLE, OREGON, ASSIGNOR TO R. J. GALBRAITH, OF COQUILLE, OREGON.

SPRING-MOUNTING FOR CYCLE-WHEELS.

1,194,206. Specification of Letters Patent. Patented Aug. 8, 1916.

Application filed October 15, 1915. Serial No. 55,944.

*To all whom it may concern:*

Be it known that I, WENDYL MEDLOCK, Jr., a citizen of the United States, residing at Coquille, in the county of Coos and State of Oregon, have invented certain new and useful Improvements in Spring-Mountings for Cycle-Wheels, of which the following is a specification.

My invention relates to improvements in cycles, and refers particularly to the frame construction of the machine, the main object being the provision of a spring connection with the main frame for the front and rear wheels to insure a smooth, comfortable and easy riding of the cycle.

Another object of my invention is the provision of a spring construction which can be applied to machines in use or at the time of their manufacture, at a small cost to greatly enhance the usefulness and desirability of the machine.

Another object of my invention is the provision of a spring structure which will absorb the shock and cause the machine to run easily and smoothly over rough surfaces and which will prove an efficient and practical addition to bicycles or motor cycles.

With these objects in view my invention consists of a spring attachment for bicycles or motor cycles, embodying novel features of construction, combination and arrangement of parts, substantially as shown, described and claimed.

Figure 1 is a side view of a bicycle provided with my improvements. Fig. 2 is a front end view of the front wheel of the bicycle and the fork in which the wheel is mounted and Figs. 3 and 4 are detail views of the front spring and clamp or securing means.

In the drawings: the improvements are shown in connection with a bicycle, but they may be used on motor cycles and perform their functions in a practical manner.

The spring attachments are used in connection with the frame A, and provide a spring support between the front wheel B, and the rear wheel C. To the lower end of the fork of the frame are connected the inner ends of the pair of links D, whose outer ends form bearings for the axle B', of the front wheel and to which axle B' are secured the lower ends E of the fork E'. The front wheel is thus movably connected with the fork of the machine, but has its axle B', mounted in the links D and the lower ends E, of the supplemental fork E', and to the upper closed end of said fork is secured an eye F to receive the loop G, on the two part adjustable flat or leaf spring H, whose inner end is clamped to the main frame by the yoke shaped clamp J.

This construction affords a spring connection between the frame of the cycle and the front wheel and the spring connection for the rear wheel consists of the rear fork K, having its lower ends secured to the axle C', of the rear wheel, said axle having bearing in the plates L, said plates having ears L', for attachment at L², with the frame and the fork at its upper end carries a pin M, to which is connected the outer end of the spring bar N. The inner end of said bar is formed with a clamp N', to bind upon the brace bar of the frame, and the spring bar is connected and further secured to the frame by the strut or brace O.

From the foregoing description taken in connection with the drawings it will be noted that I provide a construction which forms a spring bearing for the front and rear wheels as well as a spring connection between the wheels and frame of the machine; and that the improvements will provide a shock absorber to insure smooth and comfortable riding and provide a useful, desirable and practical machine.

I claim:

1. In combination with the frame and rear wheel of a cycle, a spring connection between the frame and rear wheel consisting of a spring bar connected at one end to the frame, a fork having its upper end connected to the other end of said spring bar and its lower end secured to the axle of the wheel, and a pair of plates secured to said frame, said axle having bearing in said plates.

2. A spring connection between the rear wheel and frame of a cycle, consisting of a spring bar connected at one end to the frame, a fork having its upper end connected to the other end of said spring bar, a strut secured to the frame and spring bar, and a pair of slotted plates secured to said frame, said fork having its lower end secured to the axle of the wheel, said axle having bearing in said plates.

In testimony whereof I affix my signature in the presence of two witnesses.

WENDYL MEDLOCK, Jr.

Witnesses:
C. L. TUTTLE,
B. J. SMITH.

Copies of this patent may be obtained for five cents each, by addressing the "Commissioner of Patents. Washington, D. C."